(12) United States Patent
Hishida

(10) Patent No.: US 6,217,810 B1
(45) Date of Patent: Apr. 17, 2001

(54) METHOD OF MANUFACTURING GEAR CASE

(75) Inventor: Tadashi Hishida, Osaka (JP)

(73) Assignee: VIV Engineering Inc., Osaka (JP)

( * ) Notice: Subject to any disclaimer, the term of this patent is extended or adjusted under 35 U.S.C. 154(b) by 0 days.

(21) Appl. No.: 09/620,904

(22) Filed: Jul. 20, 2000

(30) Foreign Application Priority Data

Sep. 13, 1999 (JP) ................................. 11-259160

(51) Int. Cl.[7] .................................................. B29C 45/14
(52) U.S. Cl. .......................... 264/277; 264/261; 425/123; 425/577
(58) Field of Search .............................. 29/893, 893.34, 29/893.36, 893.37; 264/275, 277, 261, 263; 425/129.1, 123, 125, 577

(56) References Cited

U.S. PATENT DOCUMENTS

| 3,532,402 | * | 10/1970 | Beery et al. | 308/236 |
| 3,893,816 | * | 7/1975 | Payne | 29/156.4 WL |
| 4,423,540 | * | 1/1984 | Hishida | 264/277 |
| 5,562,372 | * | 10/1996 | Baima et al. | 409/51 |
| 5,584,202 | * | 12/1996 | Kanamaru et al. | 72/105 |

FOREIGN PATENT DOCUMENTS 58-82071 * 5/1983 (JP).
7-214184 * 8/1995 (JP).

* cited by examiner

Primary Examiner—Angela Ortiz
(74) Attorney, Agent, or Firm—Wenderoth, Lind & Ponack, L.L.P.

(57) ABSTRACT

In a method of manufacturing a gear case comprising two support cylinders inclined relative to each other, a movable mold is arranged to be movable between an open position and a closed position in which a cavity for molding the gear case is defined between fixed and movable molds. First and third slide cores each having a protrusion are slidably supported by the movable core such that when the movable mold is moved to the closed position, the protrusions of the first and third slide cores are inserted into the cavity. Before closing the mold, first and second case-mounting surfaces are formed on the protrusion of the first slide core, axially spaced from each other, and a third case-mounting surface is formed on the protrusion of the third slide core. With a bearing case fitted on each case-mounting surface, the mold is closed and a molten resin is injected under pressure into the space between the protrusions of the first and third slide cores and the inner wall of the cavity to form the gear case.

1 Claim, 5 Drawing Sheets

METHOD OF MANUFACTURING GEAR CASE

BACKGROUND OF THE INVENTION

This invention relates to a method of manufacturing a gear case having two support cylinders inclined relative to each other.

A brush cutter includes a drive shaft driven by an engine and a rotary shaft inclined relative to the drive shaft. The rotary shaft is coupled to a joint shaft through bevel gears in a gear case connected to an elongated cylinder in which is mounted the drive shaft. The joint shaft is coupled to the driven shaft. Thus, torque is transmitted from the engine to the rotary shaft through the drive shaft, joint shaft and bevel gears.

Since the drive shaft and the rotary shaft are inclined relative to each other, they are inserted in and supported by two support cylinders of the gear case, which are inclined at the same angle as the inclination angle between the drive shaft and the rotary shaft. The joint shaft is rotatably supported by a single bearing or a combination bearing mounted on the inner wall of one of the support cylinders. The rotary shaft is rotatably supported by two bearings mounted on the inner wall of the other support cylinder so as to be axially spaced from each other.

In this arrangement, if the two bearings for supporting the rotary shaft are not precisely aligned with each other when pressed into the support cylinder, it would be difficult to press the rotary shaft into the bearings. Also, if the inclination angle between the axis of the single bearing mounted in one of the support cylinders and the axis of the two bearings mounted in the other support cylinder is inaccurate, the bevel gears mounted to the joint shaft and the rotary shaft tend to mesh incompletely. This makes it difficult to smoothly transmit torque from the joint shaft to the rotary shaft. Also, the bevel gears would produce rattling sound.

Thus, it is required to mount the bearings with high accuracy. In order to mount the bearings with high accuracy, it is necessary to finish the inner surfaces of the support cylinders by turning with high accuracy. But machining the inner surfaces of cylindrical objects with high accuracy is troublesome and time-consuming.

An object of the invention is to provide a method of easily manufacturing a gear case which has little error in the inclination angle.

SUMMARY OF THE INVENTION

According to the present invention, there is provided a method of manufacturing a gear case comprising a first support cylinder and a second support cylinder inclined relative to the first support cylinder, the method comprising the steps of:

arranging a fixed mold and a movable mold such that the movable mold is movable between an open position and a closed position in which a cavity is defined between the fixed mold and the movable mold, the cavity comprising a first portion in which the first support cylinder is molded and a second portion in which the second support cylinder is molded, the second portion protruding obliquely from the first portion;

supporting a first slide core having a protrusion for forming the inner periphery of the first support cylinder, a second slide core having pins, and a third slide core having a protrusion for forming the inner periphery of the second support cylinder so as to be slidable relative to the movable core such that when the movable mold is moved to the closed position, the protrusion of the first slide core is fully inserted into the first portion of the cavity from one end thereof, the pins of the second slide core are fully inserted into the first portion from the other end thereof to abut the end of the protrusion of the first slide core, and the protrusion of the third slide core is fully inserted into the second portion of the cavity, thereby forming a space between the inner wall of the cavity and the protrusions of the first and third slide cores;

moving the movable mold to the open position;

forming aligned cylindrical first and second case-mounting surfaces on the outer periphery of the protrusion of the first slide core near its distal and proximate ends, respectively, the second case-mounting surface having a greater diameter than the first case-mounting surface;

forming a cylindrical third case-mounting surface on the outer periphery of the protrusion of the third slide core;

mounting a metallic cylindrical bearing case having a radially inwardly extending flange at one end thereof and a radially outwardly extending eccentric flange at the other end, on each of the first to third case-mounting surfaces such that the radially inwardly extending flange is located near the distal end of the respective protrusion;

moving the movable mold to the closed position; and injecting under pressure a molten resin into the space.

DETAILED DESCRIPTION OF THE PREFERRED EMBODIMENT

Figure 5:
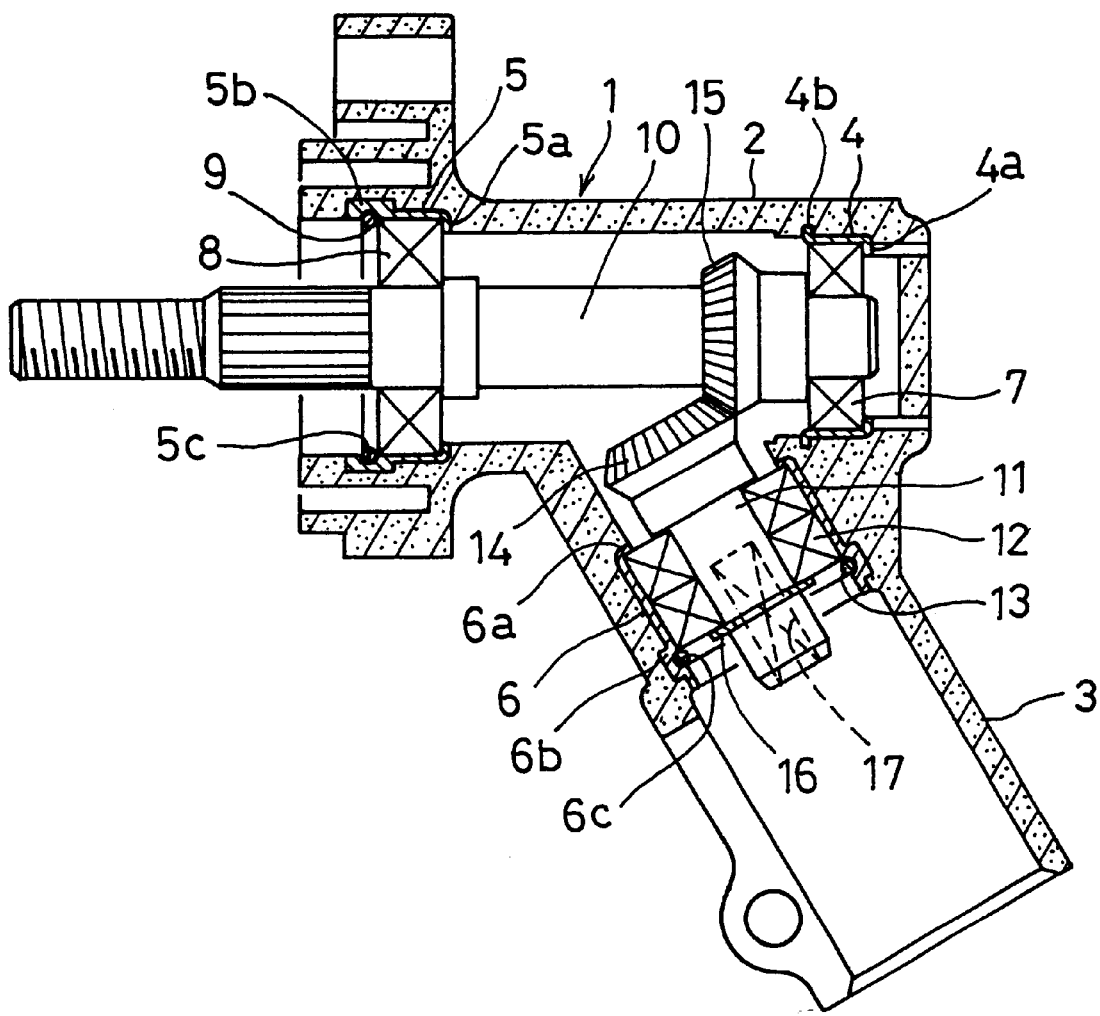
FIG. 5 is a sectional view of the gear case manufactured by use of the mold assembly of FIG. 1.

An embodiment is now described with reference to the drawings. FIGS. 1–4 show a mold assembly in which a gear case is molded. The gear case thus molded in this mold assembly is shown in FIG. 5.

The gear case 1 comprises a first support cylinder 2 and a second support cylinder 3 extending obliquely from the first support cylinder 2. First and second bearing cases 4, 5 are provided in the first support cylinder 2 so as to be axially spaced from each other. A third bearing case 6 is provided in the second support cylinder 3. The bearing cases 4, 5 and 6 are made of a metal and buried in the inner walls of the cylinders 2 and 3.

The first bearing case 4 has a radially inwardly extending flange 4a at one end thereof and a radially outwardly extending eccentric flange 4b at the other end. The second bearing case 5 is larger in diameter than the first bearing case 4 and has a radially inward flange 5a at one end thereof. At the other end, the case 5 has a radially outwardly extending eccentric flange 5b on its outer surface and is formed with a groove 5c in the inner surface.

The third bearing case 6 has at one end thereof a radially inward flange 6a and at the other end a radially outward eccentric flange 6b on the outer surface and a groove 6c in the inner surface.

With the bearings 7 and 8 mounted thereon, a rotary shaft 10 is pushed into the gear case 4 thus molded so that the bearings 7, 8 are pressed into the first and second bearing cases 4 and 5, respectively. A snap ring 9 is fitted in the groove 5c to retain the bearing 8 in position.

Into the third bearing case 6, a combination bearing 12 pressed onto the shaft 11 is pressed so that a bevel gear 14 mounted on the shaft 11 meshes with a bevel gear 15 mounted on the rotary shaft 10. A snap ring 13 is fitted in the groove 6c to retain the bearing 12 in position.

Turning force is thus transmitted from the shaft 11 to the rotary shaft 10 through the bevel gears 14, 15.

A snap ring 16 is fitted on the shaft 11 to keep the shaft from coming out of the bearing 12. A drive shaft is connected to the joint shaft 11 by engaging its front end into a square hole 17 formed in the rear end face of the joint shaft 11.

Figure 1:
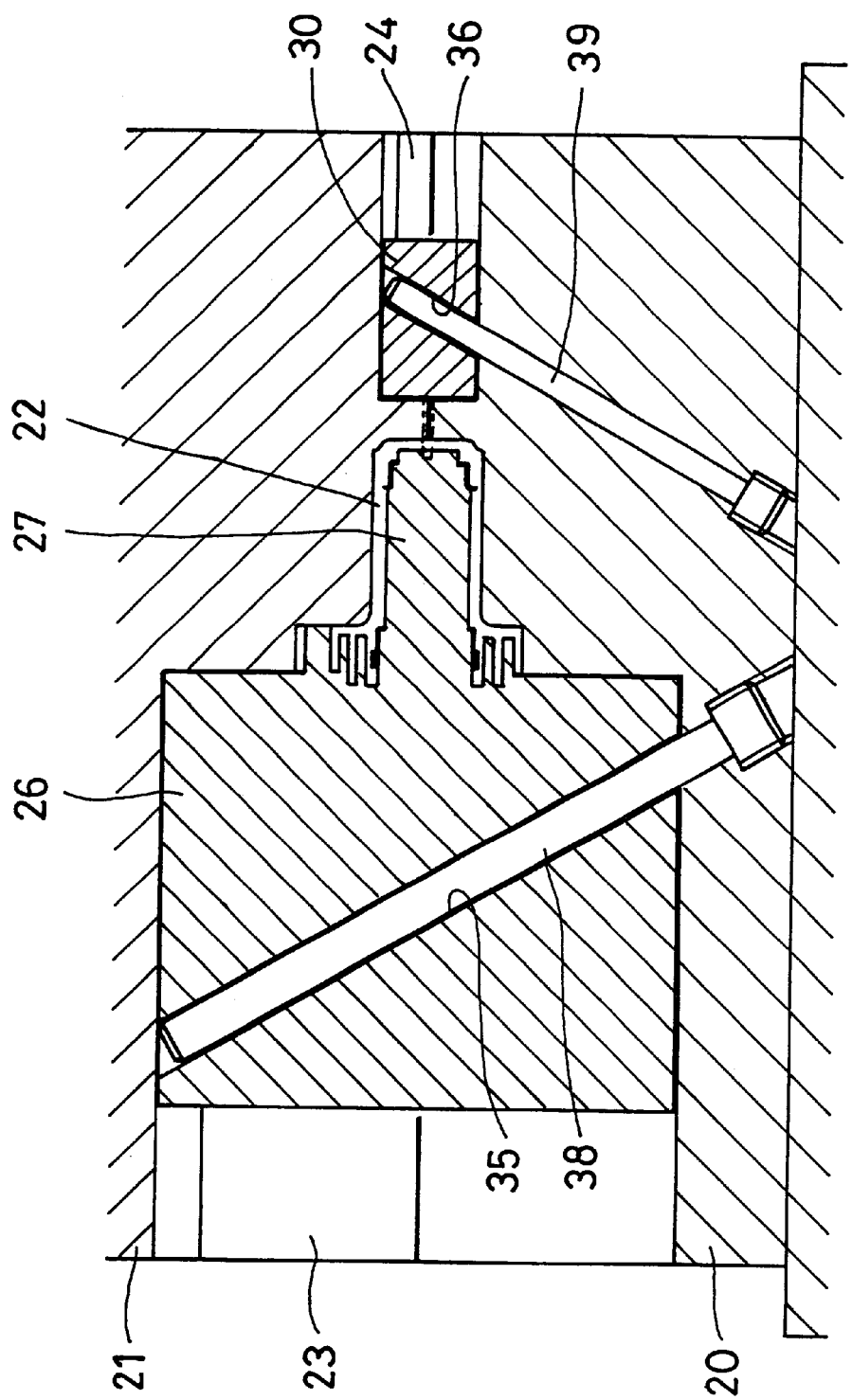
FIG. 1 is a vertical sectional front view of a mold assembly used for the method of the present invention.
Figure 2:
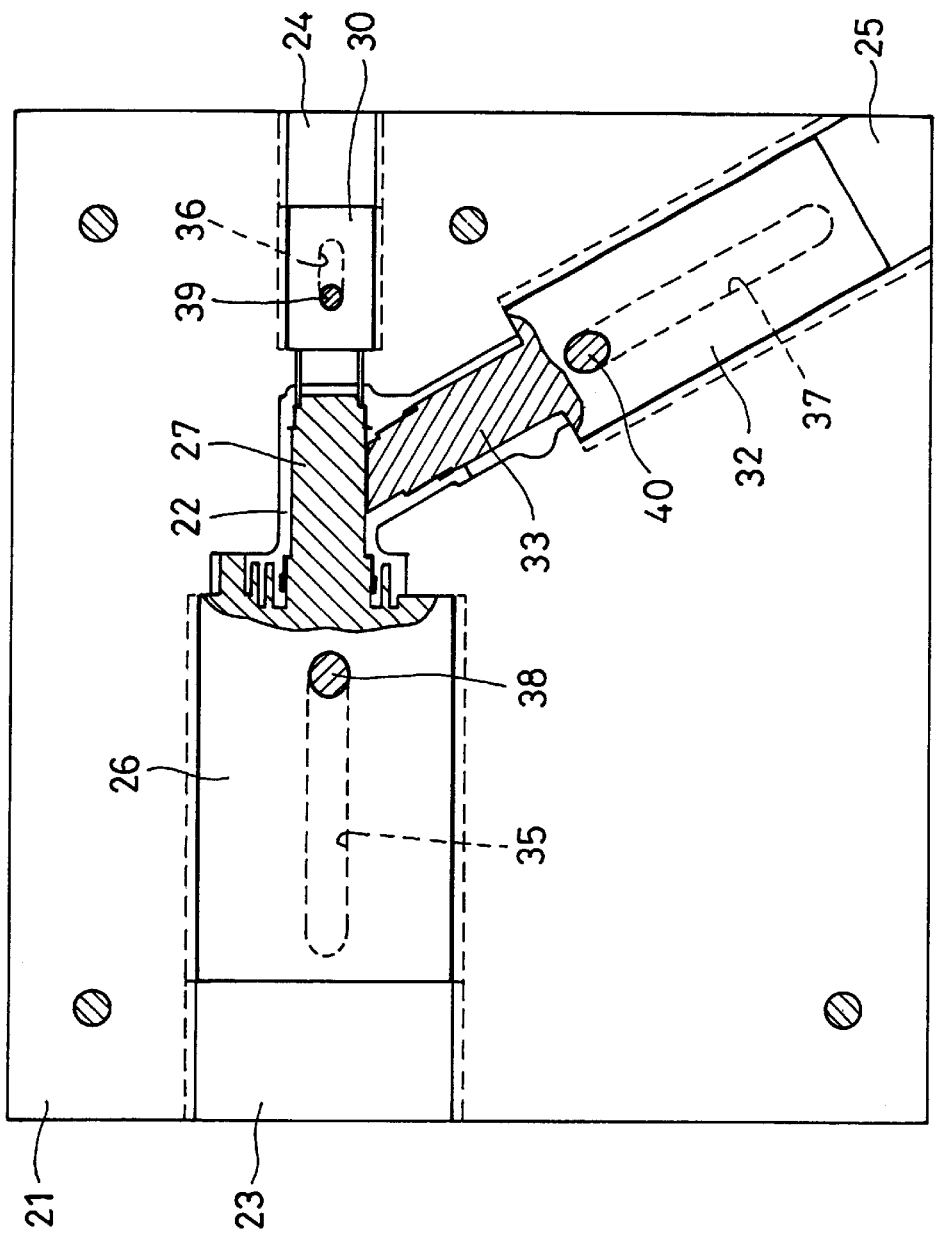
FIG. 2 is a partially cut-away bottom plan view of the mold assembly of FIG. 1, shown with the fixed mold removed.

Referring now to FIGS. 1 and 2, the mold assembly for molding a gear case includes a fixed mold 20 and a movable mold 21 movable relative to the fixed mold between a mold closed position and a mold open position. In the mold closed position, the movable mold 21 defines, in cooperation with the fixed mold 20, a cavity 22 in which the gear case 1 shown in FIG. 5 is molded, and first to third guide holes 23–25.

The cavity 22 comprises a first portion in which the first support cylinder 2 of the gear case 1 shown in FIG. 5 is molded, and a second portion in which the second support cylinder 3 is molded. The first and second guide holes 23 and 24 are provided at both ends of the first portion of the cavity 22 so as to be coaxial therewith. The third guide hole 25 is provided along the axis of the second portion of the cavity.

A first slide core 26 is slidably mounted in the first guide hole 23. It has a protrusion 27 for forming the inner periphery of the first support cylinder 2.

Figure 3:
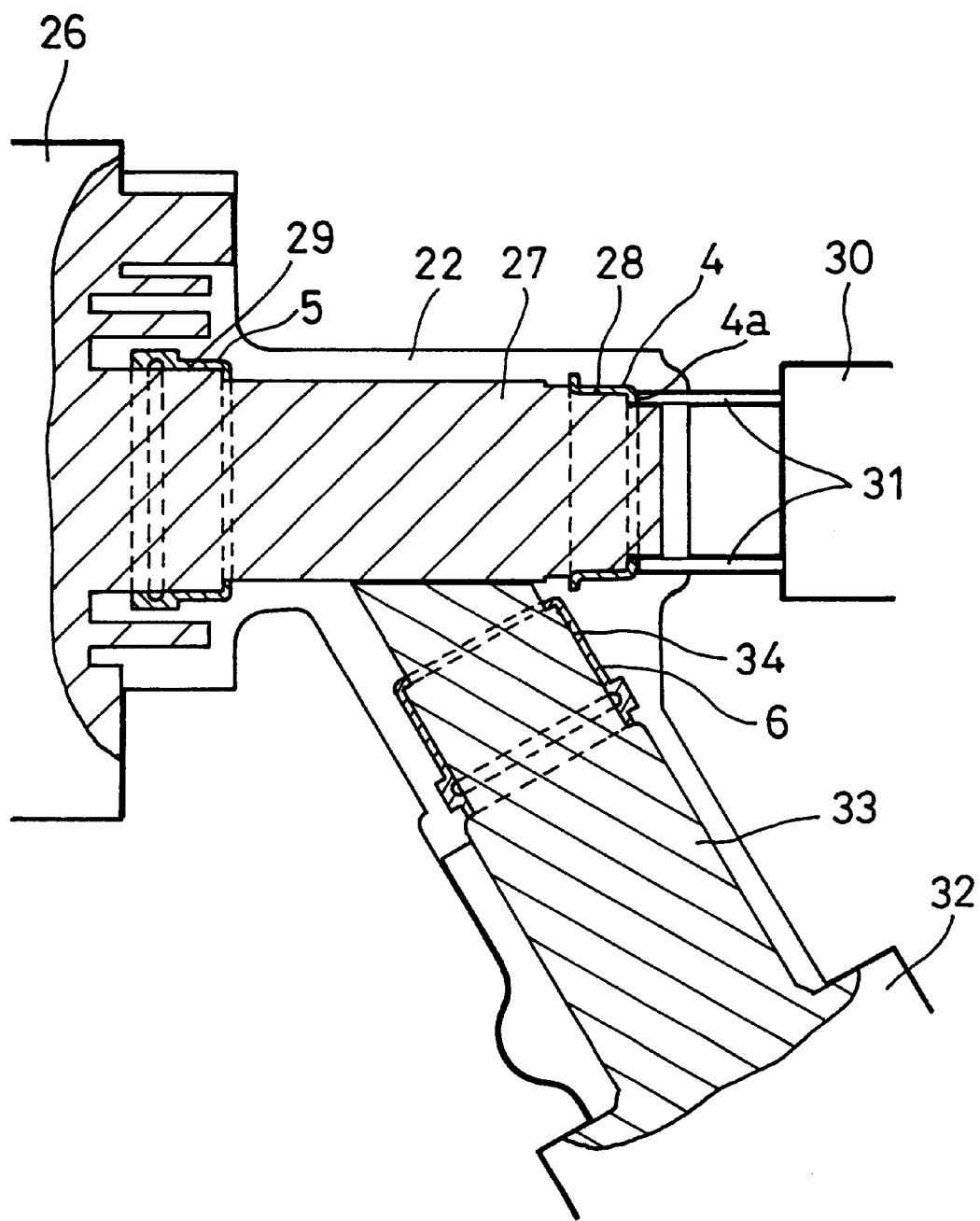
FIG. 3 is an enlarged sectional view showing the cavity defined between the fixed and movable molds.
Figure 4:
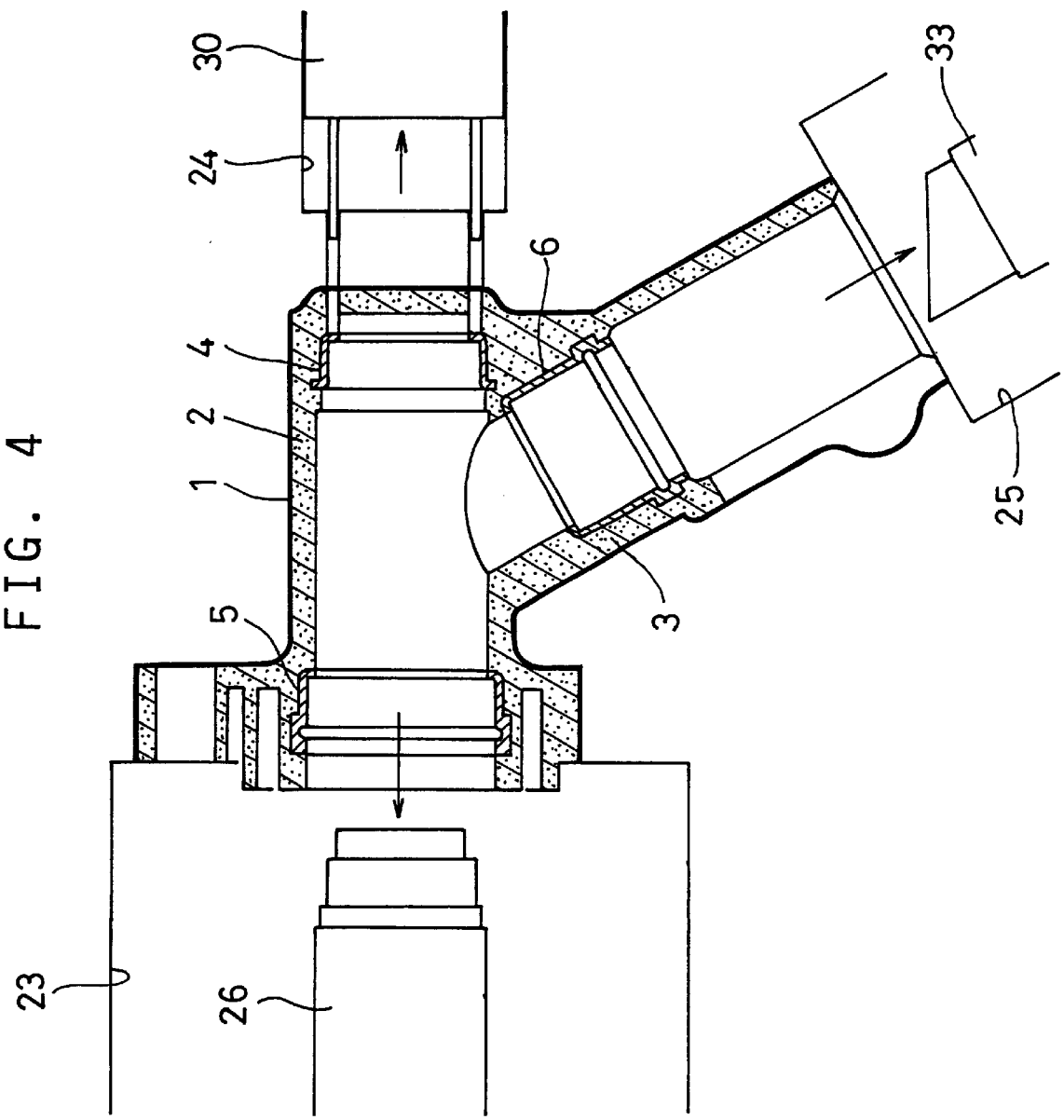
FIG. 4 is a sectional view of a gear case formed in the cavity.

As shown in FIG. 3, the protrusion 27 is formed with first and second case mounting surfaces 28 and 29 on an outer peripheral surface thereof near distal and proximate ends thereof, respectively. The first and second bearing cases 4 and 5 are fitted on the respective surfaces 28 and 29.

A second slide core 30 is slidably mounted in the second guide hole 24. It has a pair of pins 31, which are inserted through pin holes connecting the second guide hole 24 with the cavity 22 so that their ends abut the flange 4a of the first bearing case 4 mounted on the surface 28 of the protrusion 27 when the slide core 30 is fully inserted into the guide hole 24.

A third slide core 32 is slidably mounted in the third guide hole 25, and has a protrusion 33 for forming the inner periphery of the second support cylinder 3 of the gear case 1. The protrusion 33 is formed with a case mounting surface 34 on an outer periphery thereof. The third bearing case 6 is fitted on the surface 34.

The first to third slide cores 26, 30 and 32 are horizontally slidably supported by the movable mold 21, and are formed with pin holes 35, 36, 37, respectively, which extend obliquely relative to the direction in which the movable mold 21 is moved. Finger pins 38, 39, 40 having first ends thereof fixed to the fixed mold 20 are inserted in the respective pin holes 35, 36, 37.

The pin holes 35, 36 and 37 are arranged such that when the movable mold 21 is moved between the mold closed position and the mold open position, the first, second and third slide cores 26, 30 and 32 slide toward and away from the cavity 22, and that in the mold closed position, the protrusion 27 of the first slide core 26 and the protrusion 33 of the third slide core 32 are fully inserted into the cavity 22 with the pins 31 of the second slide core 30 inserted into the cavity and abutting the flange 4a of the first bearing case 4 fitted on the first case mounting surface 28 of the protrusion 27 as shown in FIG. 3.

In operation, to form the gear case 1 as shown in FIG. 5, with the movable mold 21 moved to the mold open position, the first and second bearing cases 4 and 5 are fitted on the first and second case mounting surfaces 28 and 29 formed on the protrusion 27 of the first slide core 26, and the third bearing case 6 is fitted on the case mounting surface 34 formed on the protrusion 33 of the third slide core 32. The movable mold 21 is then moved to the mold closed position.

In the mold closed position, as shown in FIG. 3, the protrusion 27 of the first slide core 26 and the protrusion 33 of the third slide core 32 are fully inserted into the cavity 22 with the pins 31 of the second slide core 30 inserted into the cavity and abutting the flange 4a of the first bearing case 4 fitted on the first case mounting surface 28 of the protrusion 27 to prevent the first bearing case 4 from coming off.

In this state, molten resin is poured into the cavity 22 under pressure and allowed to harden.

When the resin has hardened, the movable mold 21 is opened. This causes the protrusion 27 of the first slide core 26, the protrusion 33 of the third slide core 32, and the pin 31 of the second slide core 30 to retract from the cavity. Since the bearing cases are rigidly buried in the now hardened resin, they will disengage from the respective case mounting surfaces and remain in the resin when the mold 21 is opened. Thus, the gear case 1 having the bearing cases as shown in FIG. 5 is formed. The gear case is then simply removed from the mold assembly.

Thus, the gear case can be easily formed by forming case-mounting surfaces on the protrusions of the first and third slide cores, mounting bearing cases on the respective case-mounting surfaces, closing the movable mold and pouring a resin into the cavity. The case-mounting surfaces can be easily machined with high accuracy because they are formed on the outer surfaces of the protrusions. Since the bearing cases are buried in the molten resin while being supported on the case-mounting surfaces, they can be positioned with high accuracy relative to each other.

What is claimed is:

1. A method of manufacturing a gear case comprising a first support cylinder and a second support cylinder inclined relative to said first support cylinder, said method comprising the steps of:

arranging a fixed mold and a movable mold such that said movable mold is movable between an open position and a closed position in which a cavity is defined between said fixed mold and said movable mold, said cavity comprising a first portion in which said first support cylinder is molded and a second portion in which said second support cylinder is molded, said second portion protruding obliquely from said first portion;

supporting a first slide core having a protrusion for forming the inner periphery of said first support cylinder, a second slide core having pins, and a third slide core having a protrusion for forming the inner periphery of said second support cylinder so as to be slidable relative to said movable core such that when said movable mold is moved to said closed position, said protrusion of said first slide core is fully inserted into said first portion of said cavity from one end thereof, said pins of said second slide core are fully inserted into said first portion from the other end thereof to abut the end of said protrusion of said first slide core, and said protrusion of said third slide core is fully inserted into said second portion of said cavity, thereby forming a space between the inner wall of said cavity and said protrusions of said first and third slide cores;

moving said movable mold to said open position;

forming aligned cylindrical first and second case-mounting surfaces on the outer periphery of said protrusion of said first slide core near its distal and proximate ends, respectively, said second case-mounting surface having a greater diameter than said first case-mounting surface;

forming a cylindrical third case-mounting surface on the outer periphery of said protrusion of said third slide core;

mounting a metallic cylindrical bearing case having a radially inwardly extending flange at one end thereof and a radially outwardly extending eccentric flange at the other end, on each of said first to third case-mounting surfaces such that said radially inwardly extending flange is located near the distal end of the respective protrusion;

moving said movable mold to said closed position; and injecting under pressure a molten resin into said space.

* * * * *